United States Patent [19]
Babbitt et al.

[11] Patent Number: 5,146,666
[45] Date of Patent: Sep. 15, 1992

[54] METHOD AND APPARATUS FOR CUTTING, FORMING, AND INSERTING CUPS INTO TUBES

[75] Inventors: Terry Babbitt; Michael S. Braunshteyn; Andrew J. Gillespie, all of Richmond; Donald H. Jones; Billy J. Keen, Jr., both of Chesterfield; Robert H. Raynor; Renzer R. Ritt, both of Richmond; Robert E. Talley, Chester, all of Va.

[73] Assignee: Philip Morris Incorporated, New York, N.Y.

[21] Appl. No.: 794,528

[22] Filed: Nov. 19, 1991

[51] Int. Cl.$^5$ .................. B23P 17/02; B23Q 7/02
[52] U.S. Cl. .................... 29/429; 29/33 J; 29/33 K; 29/33 Q; 29/785
[58] Field of Search ........... 29/33 Q, 33 K, 33 J, 29/890.036, 235, 429, 430, 511, 563, 33 P, 33 T, 564, 564.2, 564.6, 785, 786, 792, 793

[56] References Cited

U.S. PATENT DOCUMENTS

| | | | |
|---|---|---|---|
| 331,529 | 12/1885 | Nason | 29/271 |
| 2,222,605 | 11/1940 | Carlson | 29/33 K |
| 2,370,828 | 3/1945 | Widmont | 29/33 J |
| 2,419,484 | 4/1947 | Danziger | 29/33 K X |
| 2,447,197 | 8/1948 | May | 29/225 |
| 2,698,478 | 1/1955 | Heisterkamp et al. | 29/235 X |
| 2,912,042 | 11/1959 | Jenkins | 29/563 |
| 3,201,860 | 8/1965 | Horberg, Jr. | 29/431 |
| 3,466,731 | 9/1969 | Acton et al. | 29/429 |
| 3,641,659 | 2/1972 | Colgan et al. | 29/451 |
| 3,724,339 | 4/1973 | Metzinger et al. | 29/785 X |
| 3,802,050 | 4/1974 | Verhoest | 29/511 X |
| 3,840,966 | 10/1974 | Reid et al. | 29/785 X |
| 4,052,779 | 10/1977 | Hunter | 29/429 |
| 4,584,744 | 4/1986 | Haines | 29/33 K |
| 5,031,295 | 7/1991 | Schmitt | 29/33 J |
| 5,052,095 | 10/1991 | Heckeler et al. | 29/793 X |

FOREIGN PATENT DOCUMENTS

| | | | |
|---|---|---|---|
| 482605 | 4/1952 | Canada | 29/33 Q |
| 593310 | 2/1934 | Fed. Rep. of Germany | 29/33 Q |
| 109236 | 6/1983 | Japan | 29/429 |
| 48824 | 3/1985 | Japan | 29/430 |

*Primary Examiner*—William Briggs
*Attorney, Agent, or Firm*—Karen G. Horowitz; Robert R. Jackson

[57] ABSTRACT

A method and apparatus is provided for cutting a disk of material from a continuously advancing strip of material, forming the disk into a cup, and inserting the cup into the end of a tube. The apparatus comprises a first rotating member having a plurality of workstations positioned around its periphery, a second rotating member into which tubes without cups are loaded and from which tubes containing cups are unloaded, and a set of stationary cams which control the operation of the workstations. The strip of material passes around a section of the periphery of the first member, advances at the same rate as the circumferential velocity of the first member, and comes into relative stationary contact with a number of the workstations. The rotation of the first member relative to the stationary cams provides motion to a cutting mandrel, a forming mandrel, a cutting and forming die, and an insertion mandrel associated with each workstation to perform the tasks of cutting, forming, and inserting.

18 Claims, 17 Drawing Sheets

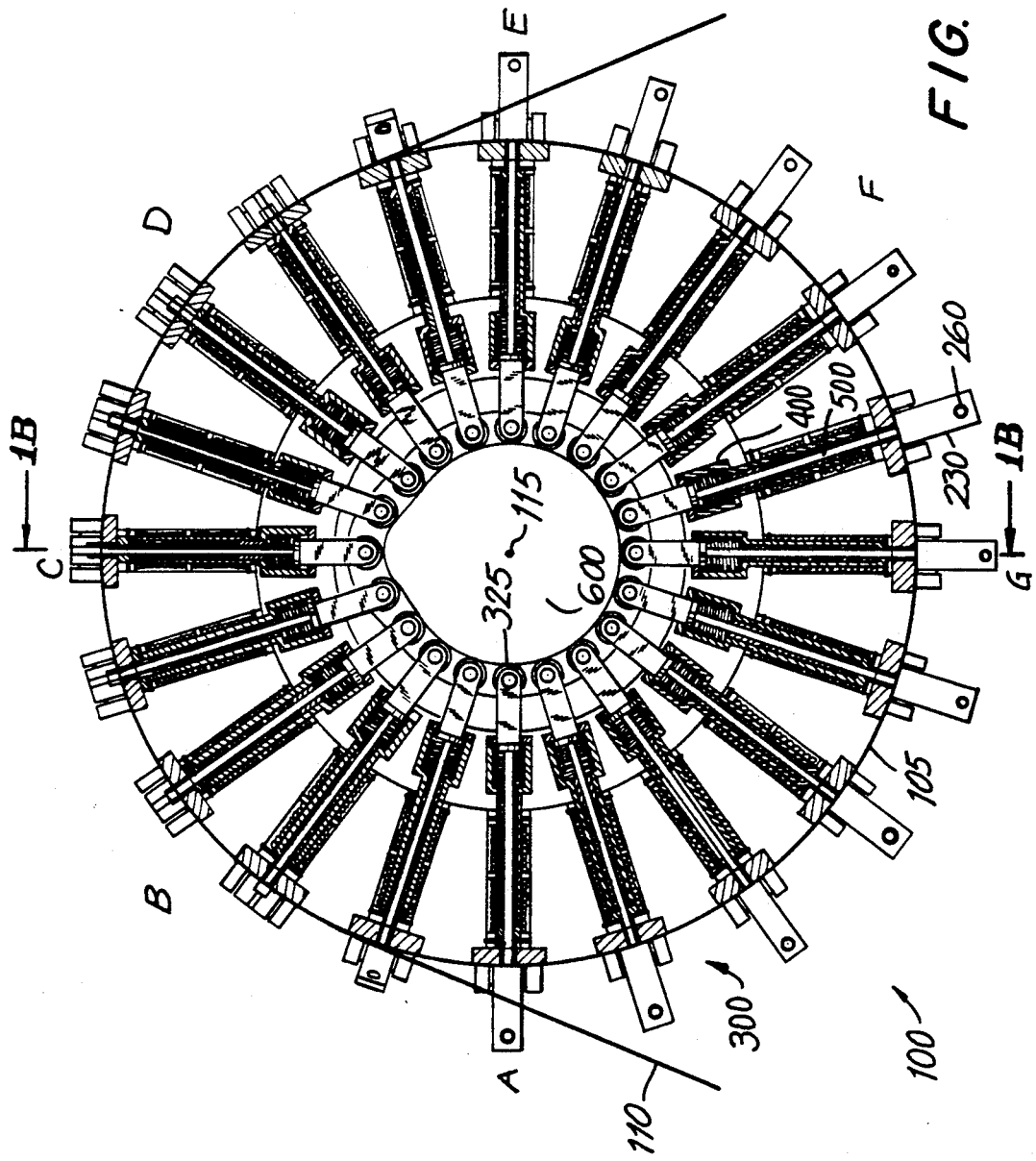

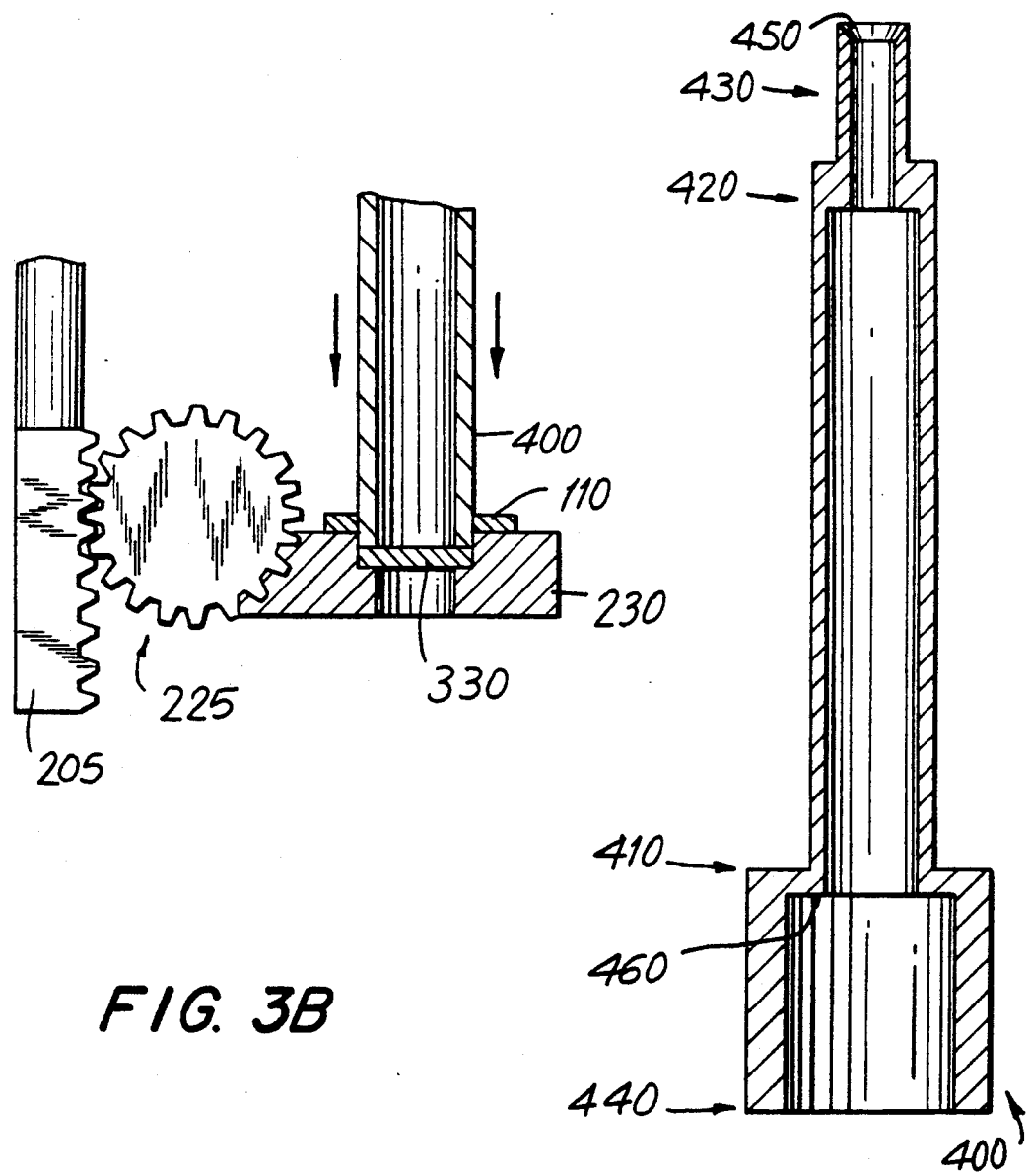

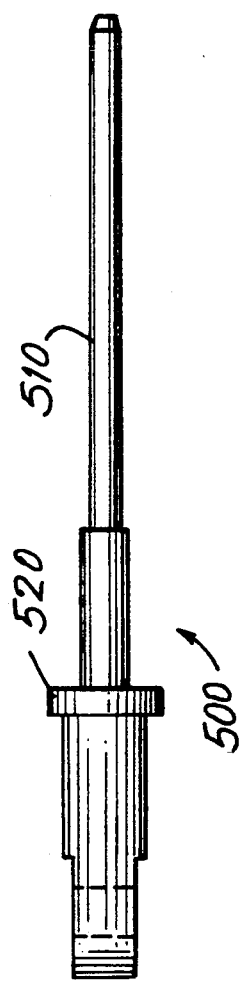
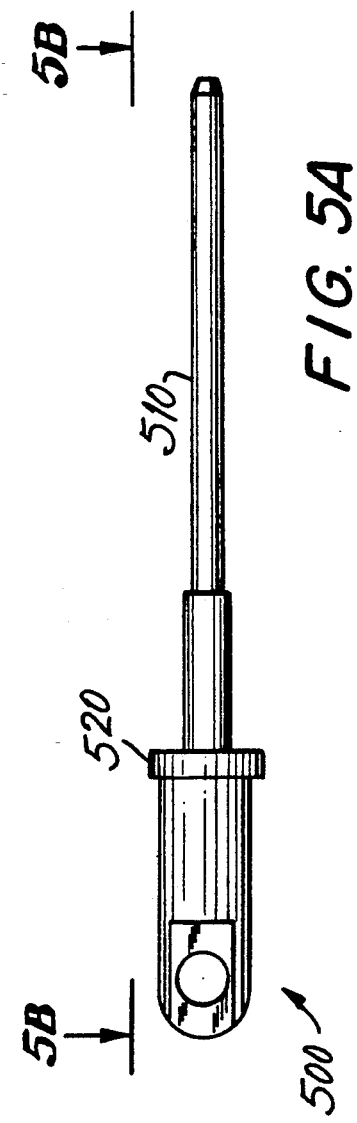

METHOD AND APPARATUS FOR CUTTING, FORMING, AND INSERTING CUPS INTO TUBES

BACKGROUND OF THE INVENTION

This invention relates to methods and apparatus for cutting, forming, and inserting cups into tubes. More particularly, it relates to a method and apparatus for cutting aluminum disks out of a continually advancing strip of aluminum, forming the disks into cups, and maneuvering and inserting the cups into the ends of tubes.

The development of smoking articles containing a carbon heat source and a particulate flavor generating material has created the need for a chamber for containing the particulate material so that heat generated by the heat source will pass into the flavor generating material and cause the material to produce a flavored aerosol or vapor for inhalation. It is known to trap particulate matter between two screens pressed into the ends of a tube for use as such chambers. One problem with such chambers is to be able to manufacture them at a high rate of production corresponding to the high rates of production associated with manufacturing smoking articles.

The prior known methods or apparatus for performing the tasks of cutting, forming, and inserting cups into the ends of tubes performed these tasks separately in an uncoordinated sequence of steps in separate devices.

Heistercamp, U.S. Pat. No. 2,698,478, relates to inserting plungers into glass tubes to a preselected depth for manufacturing syringes. A rotating wheel containing a plurality of spring-loaded pusher plates is described. Each pusher plate is translated by being rotated past a fixed cam which causes the pusher plate to insert a plunger into a tube.

Horberg, U.S. Pat. No. 3,201,860, relates to inserting a first component into a second component at a first turret workstation, and inserting the first and second components into a third component at a second turret workstation. Cam and cam follower arrangements are used at the turrets to provide the insertion forces.

Acton, U.S. Pat. No. 3,466,731, relates to a pusher element that is nested inside a cutting element that is secured to a crosshead, whereby during advancement of the crosshead, the cutting element is advanced to cut a liner from a sheet material, and the pusher element is thereafter advanced to tamp the cut liner into a closure member.

Accordingly, there is a need for a method and apparatus for performing the tasks of cutting, forming, and inserting cups into the ends of tubes in a single, high-speed machine.

Further, there is a need for a method and apparatus for assembling at high speed a retaining means and a tube for receiving particulate matter for use in the manufacture of smoking articles.

SUMMARY OF THE INVENTION

It is, therefore, an object of this invention to provide a method for cutting disks from a strip of material, forming the disks into cups, and inserting the cups into the ends of sections of pre-cut tube.

It is a further object to provide apparatus for performing the aforementioned tasks of cutting, forming, and inserting.

It is another object to provide a single machine for forming and inserting cups into preformed tubes at high speeds.

These and other objects of the invention are accomplished by providing a manufacturing method and apparatus for: (1) punching a disk out of a strip of material using a mandrel and a corresponding anvil; (2) forming the disk into a cup by pressing the disk between a die head and a die in the anvil; and (3) removing the formed cup from the die in the anvil and inserting the cup into a pre-cut section of tubing.

One aspect of the invention is directed to such an apparatus including:
a first member having a periphery;
a second member having a periphery;
a plurality of receptacles for containing a tube, the plurality of receptacles being spaced around the periphery of the second member;
means for providing and advancing the strip of material about a portion of the periphery of the first element;
a plurality of workstations for forming the cups and inserting the cups into the tubes, the workstations being positioned around the periphery of the first member, each workstation comprising
a means for cutting a disk of material from the strip of material,
a means for forming the disk into a cup,
a means for locating the cup adjacent a tube, and
a means for inserting the cup into a tube; and means for advancing first and second members so that a receptacle is held adjacent one of the plurality of workstations for receiving a cup formed at the workstation.

Preferably, each workstation includes a disk cutting mandrel, a forming mandrel nested interior to the disk cutting mandrel, an anvil including a cutting die and a forming die, and an insertion mandrel. Each of the cutting mandrel, forming mandrel, anvil, and insertion mandrel move under the control of dedicated cams which are stationary such that cam followers coupled to each of the cutting mandrel and forming mandrel, anvil, and insertion mandrel engage with and advance along the respective dedicated cams. The advance of the first member thus causes the cam followers of each workstation to pass sequentially over the respective cams, thereby to cause the workstation components to perform the above-mentioned tasks in a sequence determined by the cam configuration.

Another aspect of the invention is directed to a method for forming cups from a strip of material and inserting the cups into the ends of tubes, comprising the steps of:
providing a strip of material;
providing a first member having a periphery;
providing a plurality of workstations positioned around the periphery of the first member for forming the cups and inserting the cups into the tubes, each workstation including means for cutting a disk of material from the strip of material, means for forming the disk into a cup, means for locating the cup adjacent a tube, and means for inserting the cup into the tube;
providing a plurality of stationary cams for controlling the means for cutting a disk of material from the strip of material, the means for forming the disk into a cup, the means for locating the cup adjacent a tube, and the means for inserting the cup into the tube;
providing a second member having a periphery;

providing a plurality of receptacles for containing a tube, the plurality of receptacles being spaced around the periphery of the second member;

advancing the first and second members so that each receptacle holds a tube adjacent each workstation in a first region;

advancing the strip of material around a portion of the periphery of the first member in synchronism with the advance of the first member so that the strip of material comes into relative stationary contact with each workstation in a second region; and imparting controlling motion to each of the plurality of workstations by the advance of the workstation on the first member relative to the stationary cams whereby each workstation performs the steps of cutting a disk of material from the strip of material, forming the cut disk into a cup, positioning the formed cup adjacent a tube, and inserting the formed cup into the adjacent tube.

In accordance with the preferred embodiment, the first member is a rotating wheel and the cutting, forming, and insertion of a single cup is accomplished as a single workstation on the wheel makes one complete revolution. As the revolution begins, the anvil pivots under the control of a cam to capture the strip between the anvil and the disk cutting mandrel at a first location. The disk cutting mandrel is then moved by a cutting and forming cam to pierce the strip to form a disk at a second location, the second location being downstream of the first location. Next, the forming mandrel is advanced by the cutting and forming cam to form the cup in the die and to press the cup into a hole which passes through the anvil. The cutting and forming mandrels are then retracted by the cutting and forming cam at a third location that is downstream of the second location. The anvil then pivots away from the strip at a fourth location to place the formed cup, which is still held in the anvil forming die, in alignment with a precut section of tube. The insertion mandrel is then actuated by its cam to push the cup through the anvil into the pre-cut section of tube. Preferably, the second member is a drum, the pre-cut tube is held in the receptacle by vacuum, and the receptacle rotates in synchronism with the workstation during the cup installation.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which:

FIG. 1A is a cross-sectional front view of a preferred embodiment of a cutting, forming, and inserting apparatus in accordance with the present invention;

FIG. 3B is a cross-sectional view of a cutting mandrel cutting a disk out of a strip of material in accordance with an embodiment of the present invention;

FIG. 4 is a cross-sectional view of a cutting mandrel;

FIG. 5A is a top view of a forming mandrel;

FIG. 5B is a side view taken along line 5B—5B of FIG. 5A;

DETAILED DESCRIPTION OF THE PREFERRED EMBODIMENT

Figure 1B:
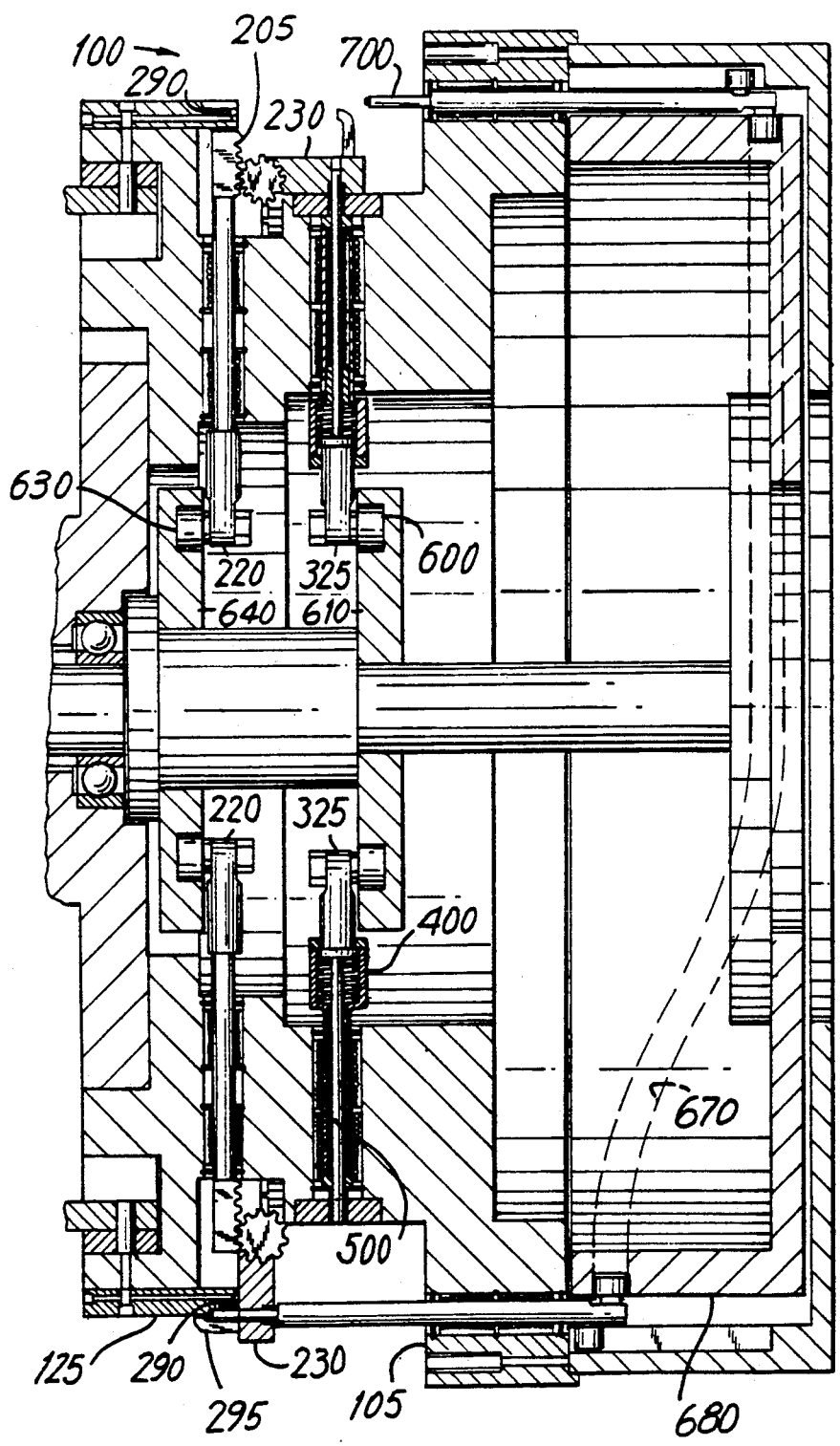
FIG. 1B is a side sectional view taken along line 1B—1B of FIG. 1.
Figure 2A:
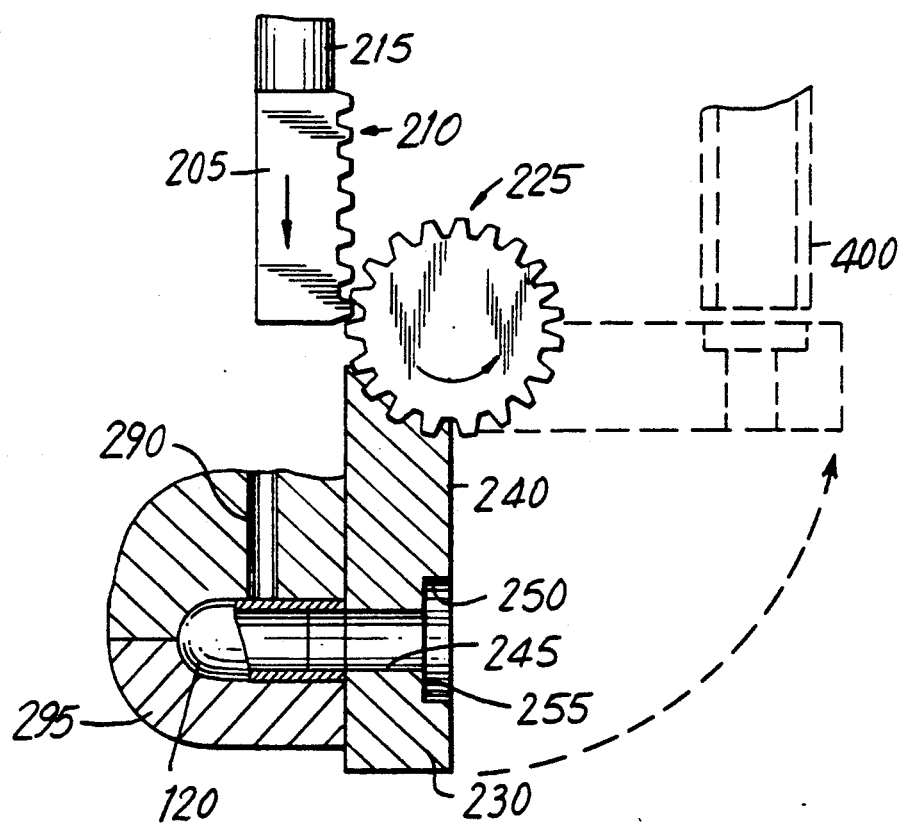
FIG. 2A is a cross-sectional view of the anvil of FIG. 1A pivoting to a position adjacent the cutting and forming mandrels.
Figures 2B, 2C:
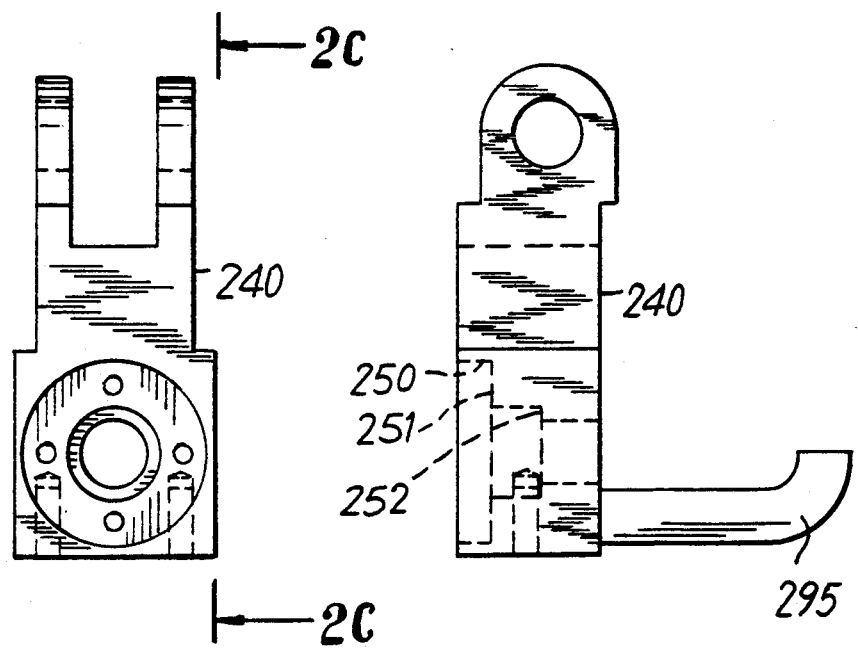
FIG. 2B is a top view of an anvil of FIG. 1A.
FIG. 2C is a side view taken along line 2C—2C of FIG. 2B.
Figures 2D, 2E:
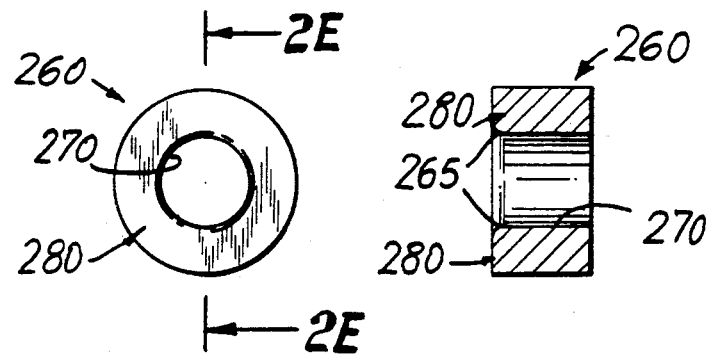
FIG. 2D is a top view of a cutting and forming die of FIG. 1A.
FIG. 2E is a cross-sectional view taken along line 2E—2E of FIG. 2D.
Figures 2F, 2G:
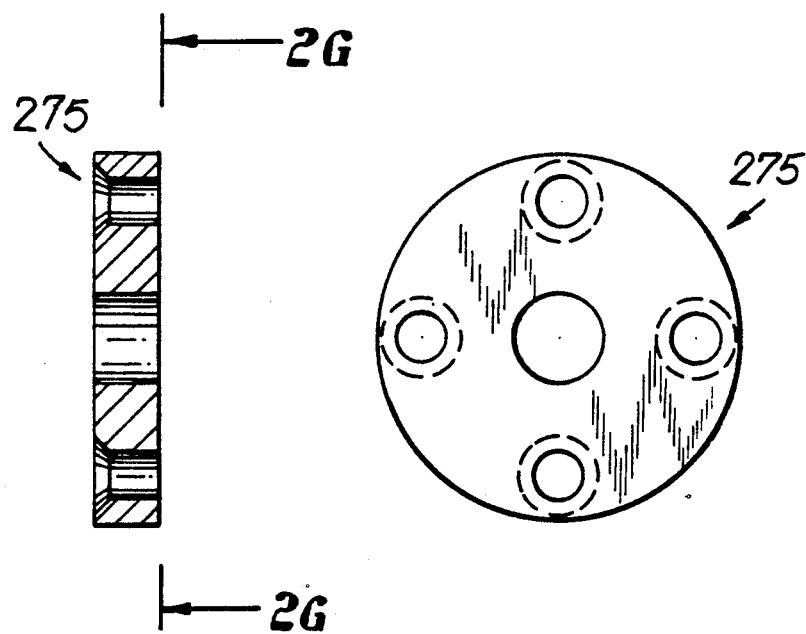
FIG. 2F is a cross-sectional view of a retaining cap of FIG. 1A.
FIG. 2G is a top view taken along line 2G—2G of FIG. 2F.

Referring to FIGS. 1 to 9, a cutting, forming, and inserting apparatus 100 in accordance with a preferred embodiment of the present invention is shown.

Apparatus 100 includes rotating wheel 105 having a plurality of workstations 300, cutting and forming cam 600, pivoting cam 630, insertion cam 670, and rotating drum 125.

Wheel 105 and drum 125 are adjacent one another and mounted so that their axes of rotation are coincident. Cams 600 and 630 comprise grooves 605 and 635 on flat surfaces of wheels 610 and 640 which are mounted parallel to the plane of rotation of apparatus 100. Cam 670 comprises groove 675 on the curved surface of cylinder 680 which is mounted with its longitudinal axis coincident with the axis of rotation of apparatus 100.

Cams 600, 630, and 670 are coupled by cam followers to workstations 300. Each workstation 300 includes anvil 230 having cutting die 260 and passage 250, cutting mandrel 400 and forming mandrel 500 driven by cutting and forming cam 600, and insertion mandrel 700 driven by cam 670. Through the rotation of wheel 105, cams 600 and 630 provide motion for cutting, forming, and pivoting which is directed radially from center 115 of apparatus 100. Similarly, cam 670 provides motion for insertion which is parallel to the axis of rotation of apparatus 100.

Aluminum strip 110 is wrapped around a portion of the circumference of wheel 105 and comes into contact with a number of workstations 300. Strip 110 is fed at the same rate as the circumferential velocity of wheel 105 so that, while they are in contact, the strip and the workstations are substantially stationary relative to each other.

In one rotation of wheel 105, twenty cups are produced and inserted. Each cutting mandrel 400 cuts disk 330 out of strip 110, each forming mandrel 500 forms a disk into cup 810, and the cups are inserted into pre-cut sections of tubing 120 which are held in rotating drum 125 by a vacuum applied through one or more channels 290 and a hood 295 which encloses and stabilizes the tube. Drum 125 rotates in synchronism with wheel 105 so that a pre-cut section of tube can be loaded into each workstation at every twentieth of a revolution.

The operation of apparatus 100 will be explained by describing the operations accompanying one revolution of a reference workstation. The operations of the workstation are governed by the location of the workstation as it revolves relative to the cams, and the same operations are therefore performed cyclically, with the particular operation depending on the location (or angle of revolution) of the workstation. Accordingly, as shown in FIG. 1A, the periphery of apparatus 100 is divided into seven ranges labeled A through G corresponding to seven stages of cup formation and insertion by one workstation. It is to be understood, however, that each workstation operates in a similar manner, and that twenty complete cutting, forming, and inserting operations are obtained per revolution of apparatus 100 as described in the following paragraphs.

As the reference workstation moves from position A to position B, anvil 230 is pivoted onto aluminum strip 110 by rack 205 and pinion 225.

Referring to FIG. 2, anvil 230 preferably comprises an oblong portion 240 and a fluted cylindrical portion which forms pinion 225. Pinion 225 can rotate about its own axis which is mounted tangentially to wheel 105. Oblong portion 240 is secured to pinion 225 such that rotation of pinion 225 causes oblong portion 240 to pivot.

Anvil 230 includes hole 250 comprising three concentric circular holes with different diameters whose depths decrease with increasing diameter to form ledges 251 and 252. Cutting and forming die 260 is inserted into hole 250 so as to rest on ledge 251. Retaining ring 275 is secured to ledge 252 so as to hold die 260 in anvil 230. Die 260 is preferably made of tool steel.

Rack 205 oscillates, under the influence of cam 630, along its longitudinal axis which lies along a radial line from center 115 of apparatus 100. Rack 205 includes a toothed face 210 and a shaft 215. Toothed face 210 engages pinion 225, and shaft 215 is secured to cam follower 220. Cam follower 220 rides on cam 630 which is stationary so that the rotation of apparatus 100 imparts radial motion through cam follower 220 to rack 205 and this, in turn, rotates pinion 225 and pivots oblong portion 240.

When the reference workstation is at position A, anvil 230 is pivoted by rack 205 and pinion 225 so that the longitudinal axis of oblong portion 240 is directed radially outward from center 115 of apparatus 100, and strip 110 is free to move in between anvil 230 and mandrels 400 and 500. As the reference workstation rotates away from position A, cam 630 moves rack 205 radially outward from center 115. The movement of rack 205 causes pinion 225 to rotate so as to pivot anvil 230 to a position where the longitudinal axis of oblong portion 240 is parallel to the axis of rotation of apparatus 100. In thus pivoting, anvil 230 captures strip 110 and holds it against mandrels 400 and 500. At position B, anvil 230 is fully pivoted.

As the reference workstation moves from position B to position C, cutting mandrel 400 cuts disk 330 out of aluminum strip 110, as seen in FIG. 3B.

Referring to FIG. 4, a cutting mandrel 400 in accordance with a preferred embodiment of the present invention is shown. Mandrel 400 preferably comprises a hollow cylinder whose internal and external diameters both decrease in steps along the length of the mandrel so as to form a narrow end 430 and a wide end 440. At narrow end 430, the internal surface of mandrel 400 includes bevel 450 so that the cross section forms an annulus with a predetermined width.

Figure 3A:
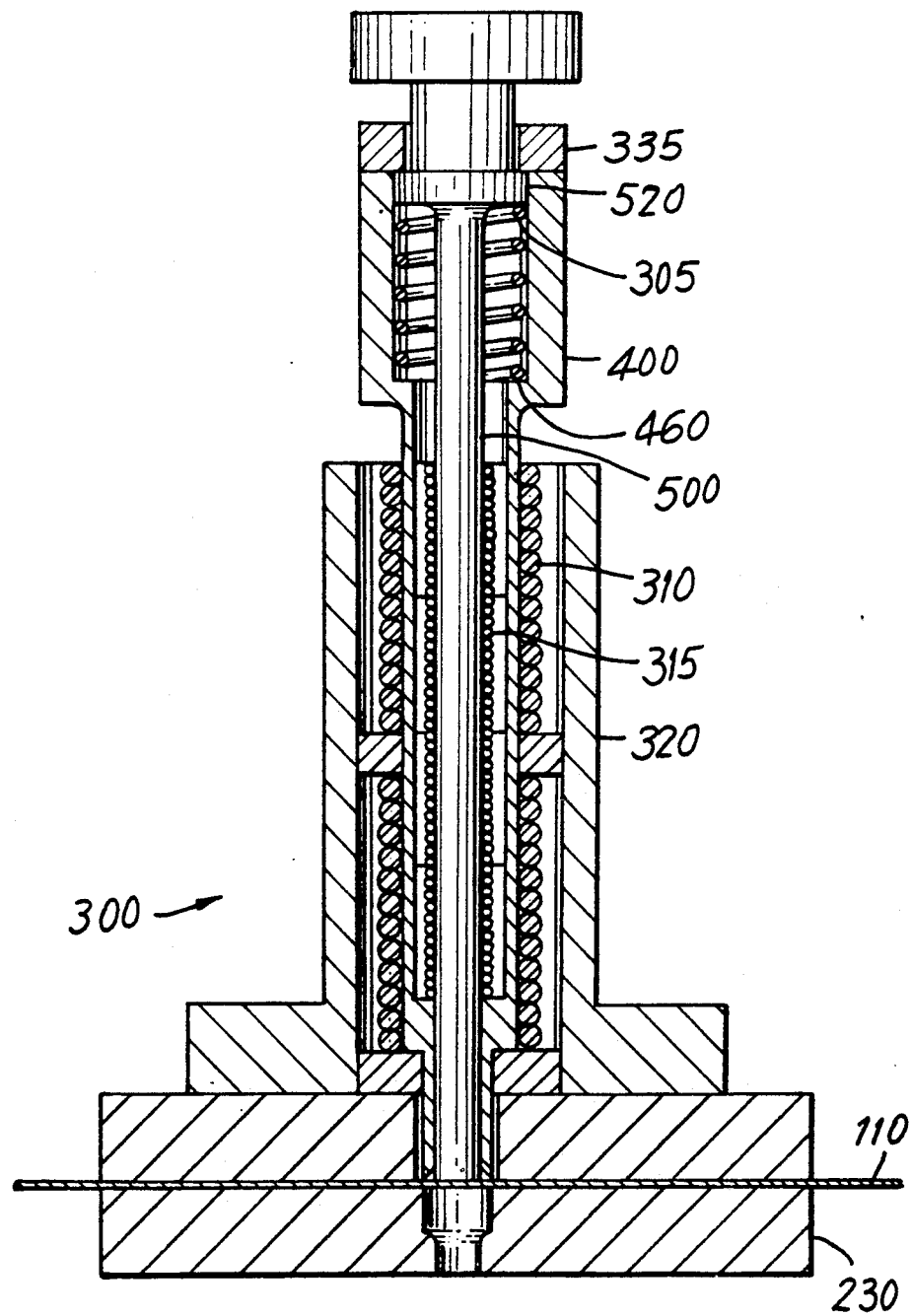
FIG. 3A is a cross-sectional view of a workstation of FIG. 1A.
Figure 6A:
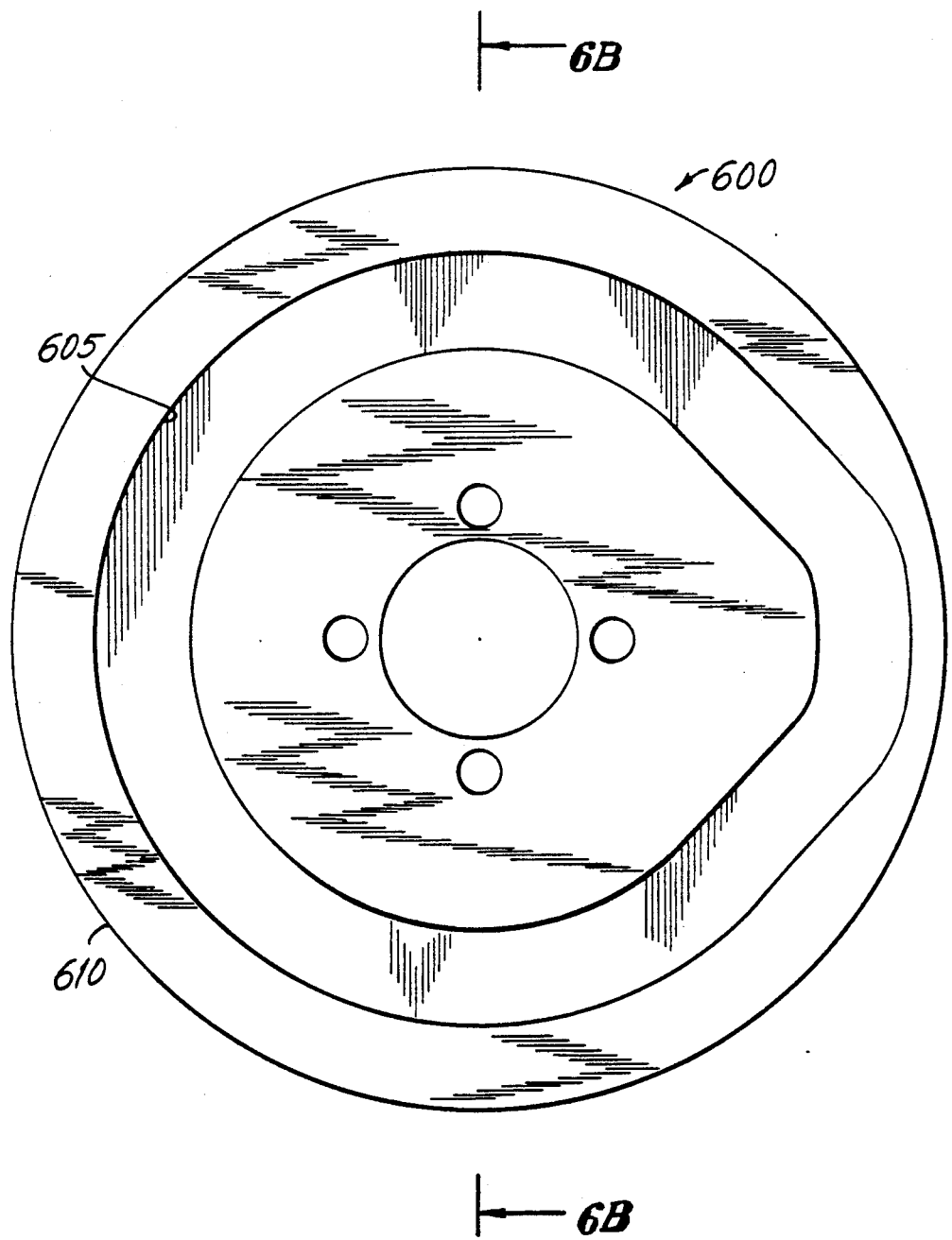
FIG. 6A is a front view of a cutting and forming cam of the present invention.
Figure 6B:
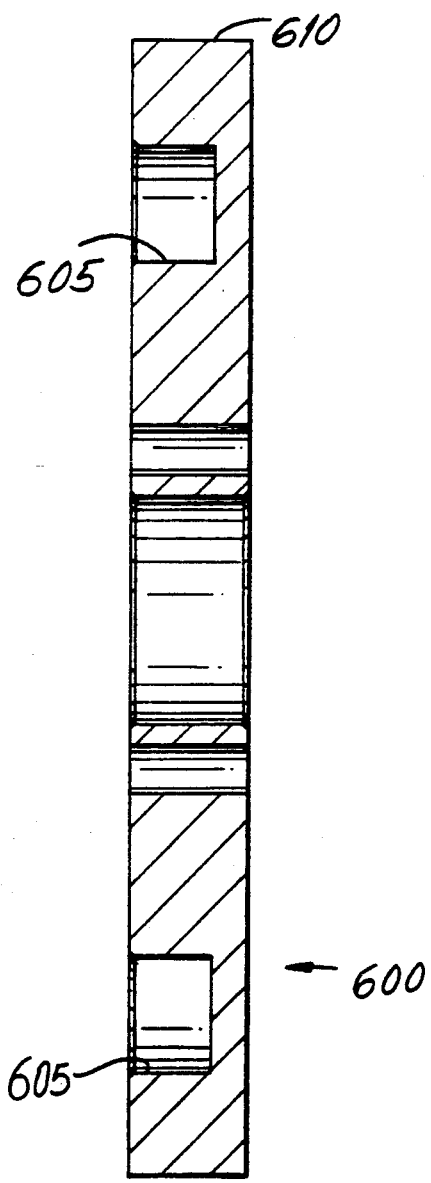
FIG. 6B is a cross-sectional view taken along line 6B—6B of FIG. 6A.
Figure 6C:
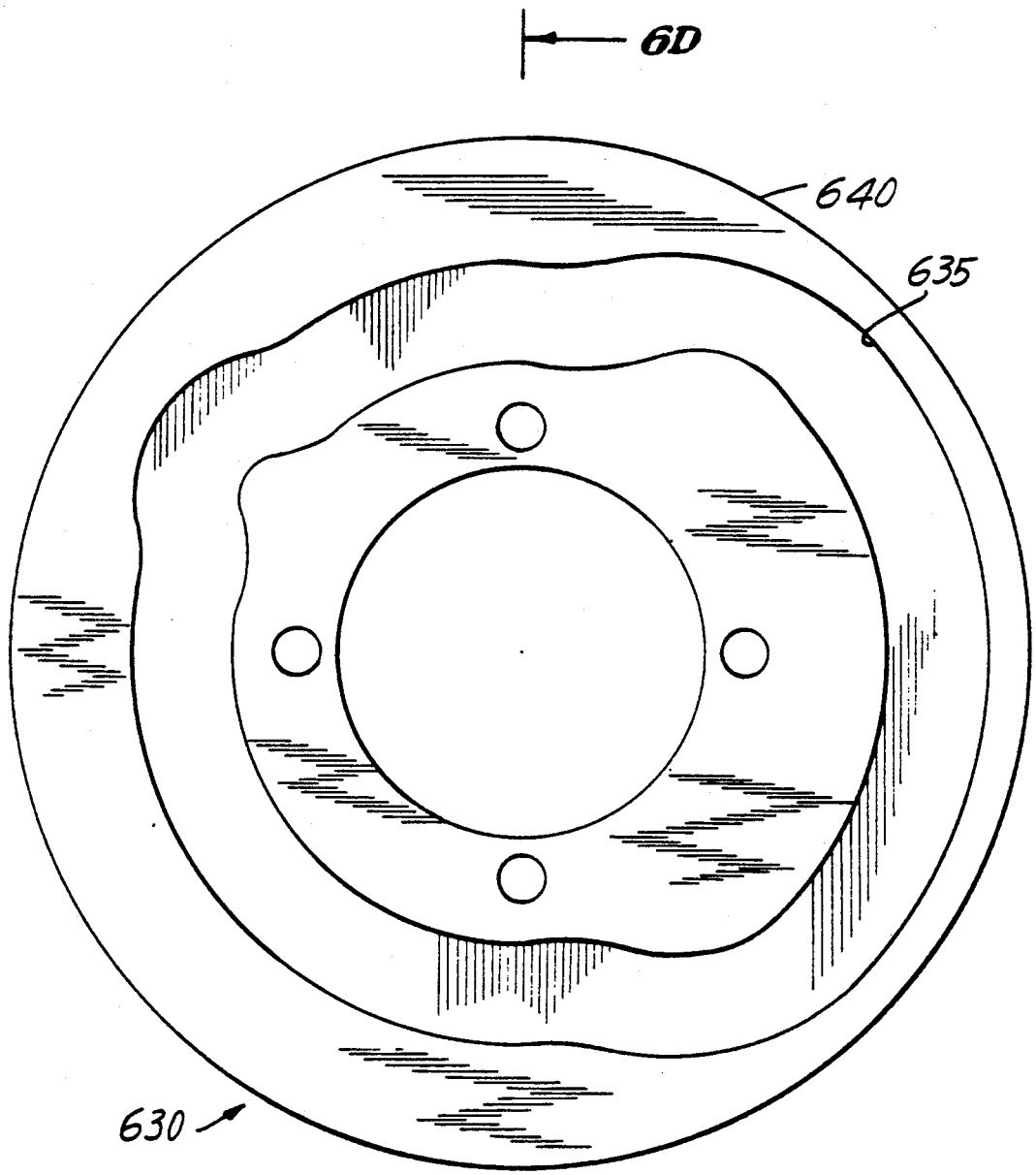
FIG. 6C is a front view of a pivoting cam of the present invention.
Figure 6D:
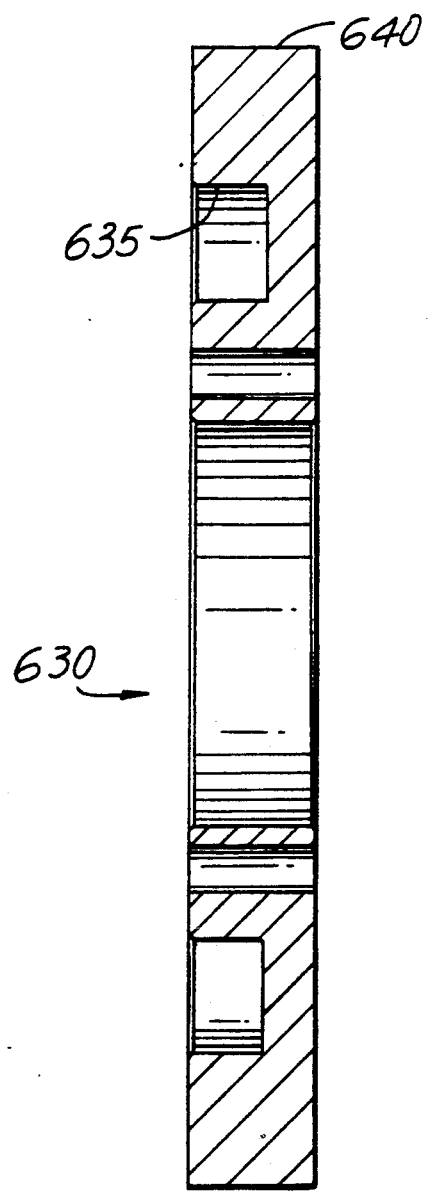
FIG. 6D is a cross-sectional view taken along line 6D—6D of FIG. 6C.
Figure 6E:
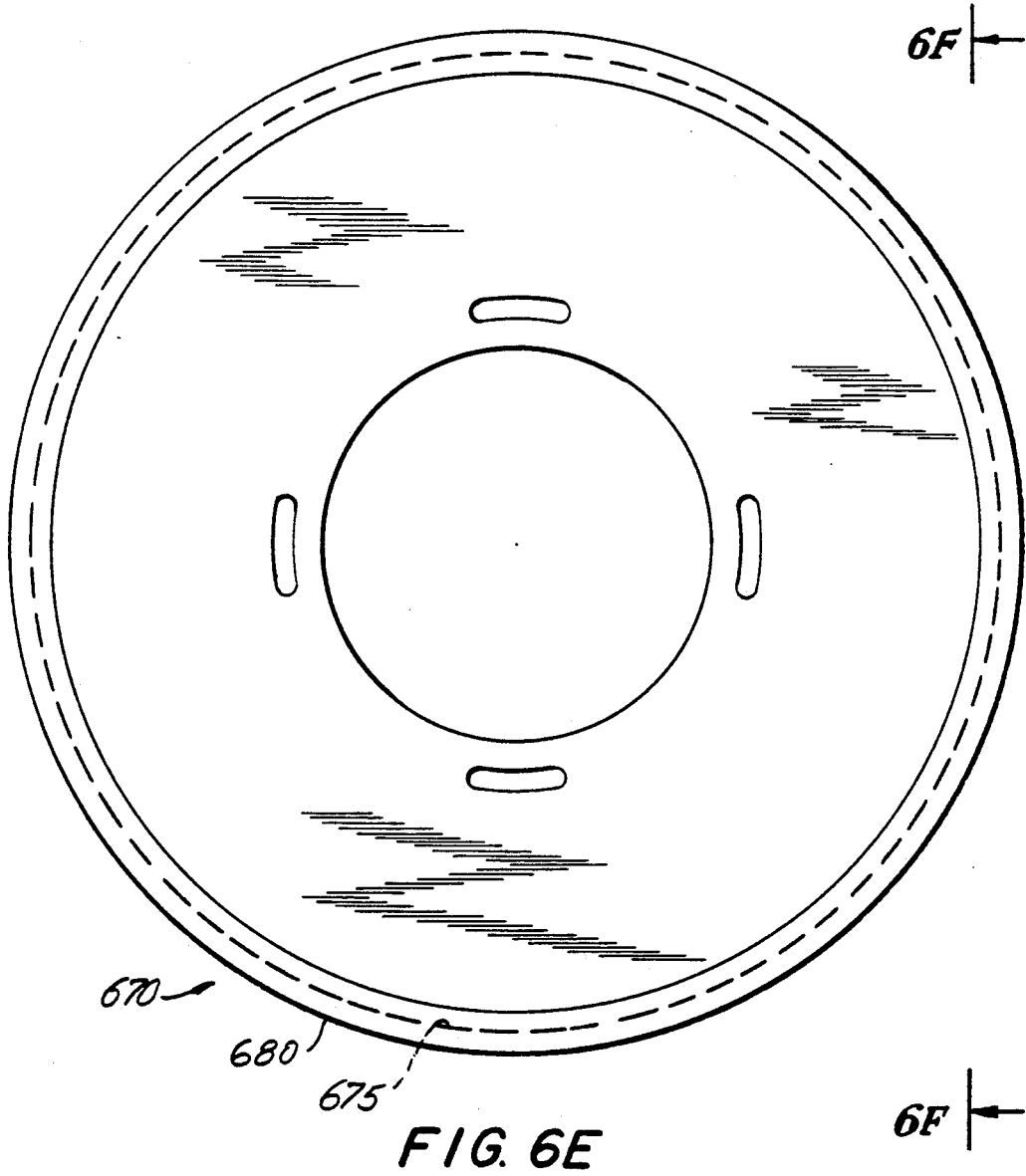
FIG. 6E is a front view of an insertion cam of the present invention.
Figure 6F:
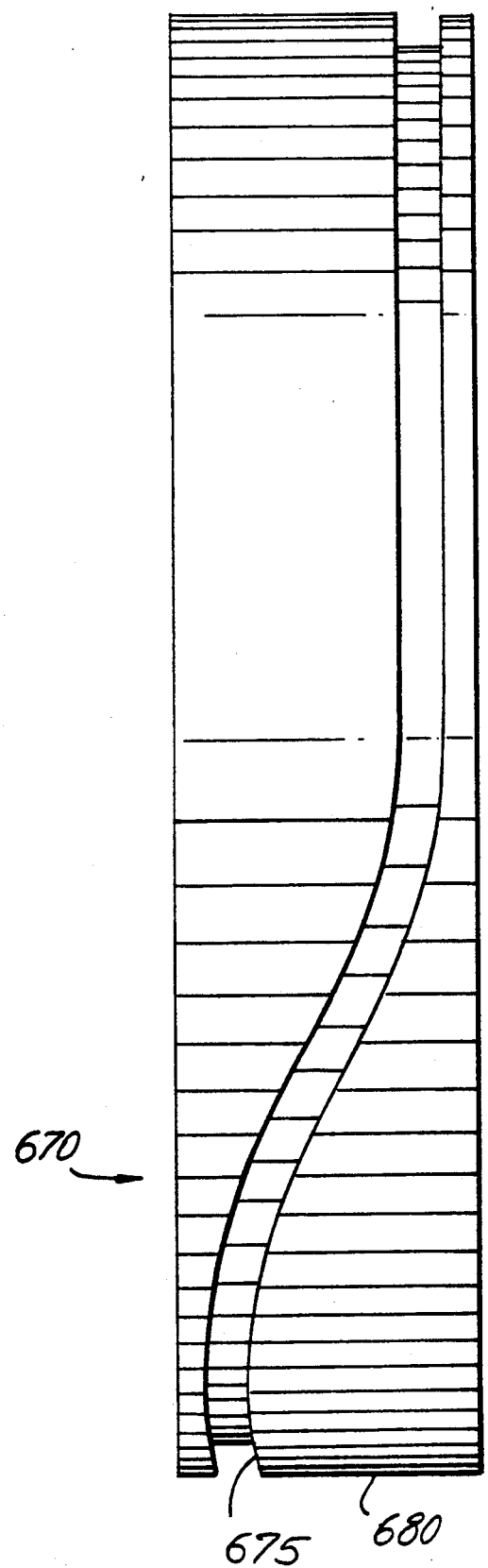
FIG. 6F is a side view taken along line 6F-6F of FIG. 6E.
Figure 6G:
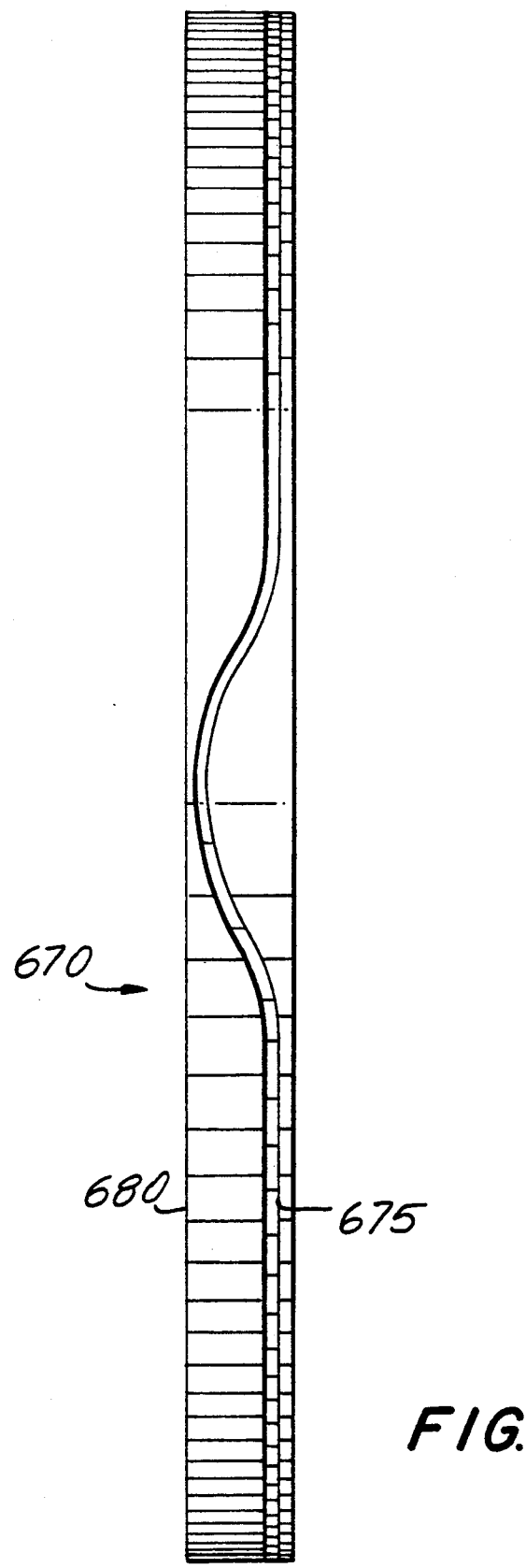
FIG. 6G is a development of the curved surface of the insertion cam of FIG. 6E.
Figure 7:
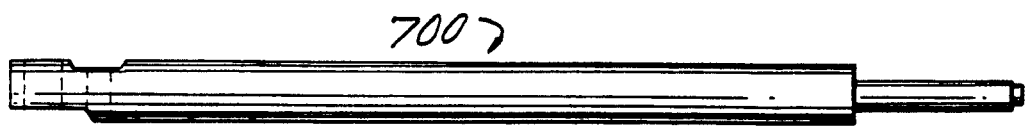
FIG. 7 is an inserter rod.

Referring to FIG. 3A, spring 305 is placed inside wide end 440 of mandrel 400, and rests on ledge 460 formed as the internal diameter of mandrel 400 makes its first step. Referring to FIGS. 3A, 5A, and 5B, forming mandrel 500, having a shaft 510 and a head 520, is nested interior to cutting mandrel 400 so that shaft 510 projects through the interior of mandrel 400 and head 520 rests on spring 305. Annular retainer 335 is secured to cutting mandrel 400 so as to retain forming mandrel interior to cutting mandrel 400. Linear bearings 310 and 315 are held by friction inside cutting mandrel 400 and casing 320, providing low-friction paths for mandrels 400 and 500 to oscillate longitudinally. Casing 320 is mounted on wheel 105 so that the longitudinal axes of mandrels 400 and 500 lie on a radial line from center 115. As wheel 105 rotates, cam 600 causes cam follower 325 to move radially and thereby to move mandrels 400 and 500 longitudinally.

At position B, cam 600 starts to push mandrels 400 and 500 radially outward towards strip 110 which is held against anvil 230. FIGS. 3A and 3B show a cross-section of a single workstation as cutting mandrel 400 pierces strip 110. Cam follower 325 pushes directly against head 520 of forming mandrel 500. Head 520, in turn, pushes against spring 305, and spring 305 pushes against ledge 460 of cutting mandrel 400. Between positions B and C, as cam follower 325 moves radially outward, it pushes cutting mandrel 400 so as to pierce strip 110, and thus form disk 330 of aluminum strip.

Cutting mandrel 400 is driven indirectly by cam follower 325 through spring 305 which is sufficiently strong that cutting mandrel 400 can pierce aluminum strip 110, but is sufficiently weak that mandrel 400 can be halted by contacting die 260 without damage to rack 205, pinion 225, or the cutting edge of mandrel 400. Continued rotation of wheel 105 causes cutting mandrel 400 to move further through aluminum strip 110 into hole 250 in anvil 230 until it is stopped at face 280 of die 260. Still further outward radial motion of cam follower 325 produces no further radial motion of mandrel 400; instead, spring 305 is compressed.

Figure 8:
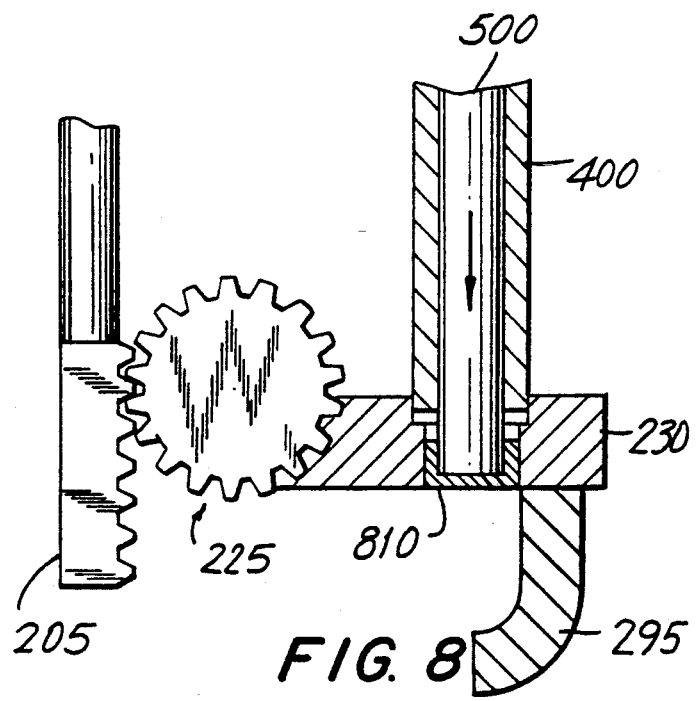
FIG. 8 is a cross-sectional view of a forming mandrel forming a disk of material into a cup in accordance with an embodiment of the present invention.

As wheel 105 continues to rotate to position C, the reference workstation forms aluminum disk 330 into cup 810. Referring to FIG. 8, after cutting mandrel 400 is stopped by face 280 of die 260, further outward radial motion of cam follower 325 causes forming mandrel 500 to continue moving into hole 250. In so doing, mandrel 500 pushes disk 330 radially outward until its outer edge rests against curved ledge 265 of cutting and forming die 260. As mandrel 500 moves yet further radially outward, it pushes the inner portion of disk 330 into narrow section 270 and in so doing causes the outer edge of disk 330 to be bent against ledge 265 to form cup 810. Outward radial motion of mandrel 500 ceases at position C, at which position cup 810 is fully formed. It should be understood that separate cams or cam followers could be used to control cutting mandrel 400 and forming mandrel 500.

As apparatus 100 rotates beyond position C to position D, cam 600 moves mandrels 400 and 500 radially inward so as to retract them from anvil 230. Cup 810 remains, held by friction, in narrow portion 270 of cutting and forming die 260. Mandrels 400 and 500 continue their radial inward motion until they are fully retracted from anvil 230 when the reference workstation reaches position D.

Figure 9:
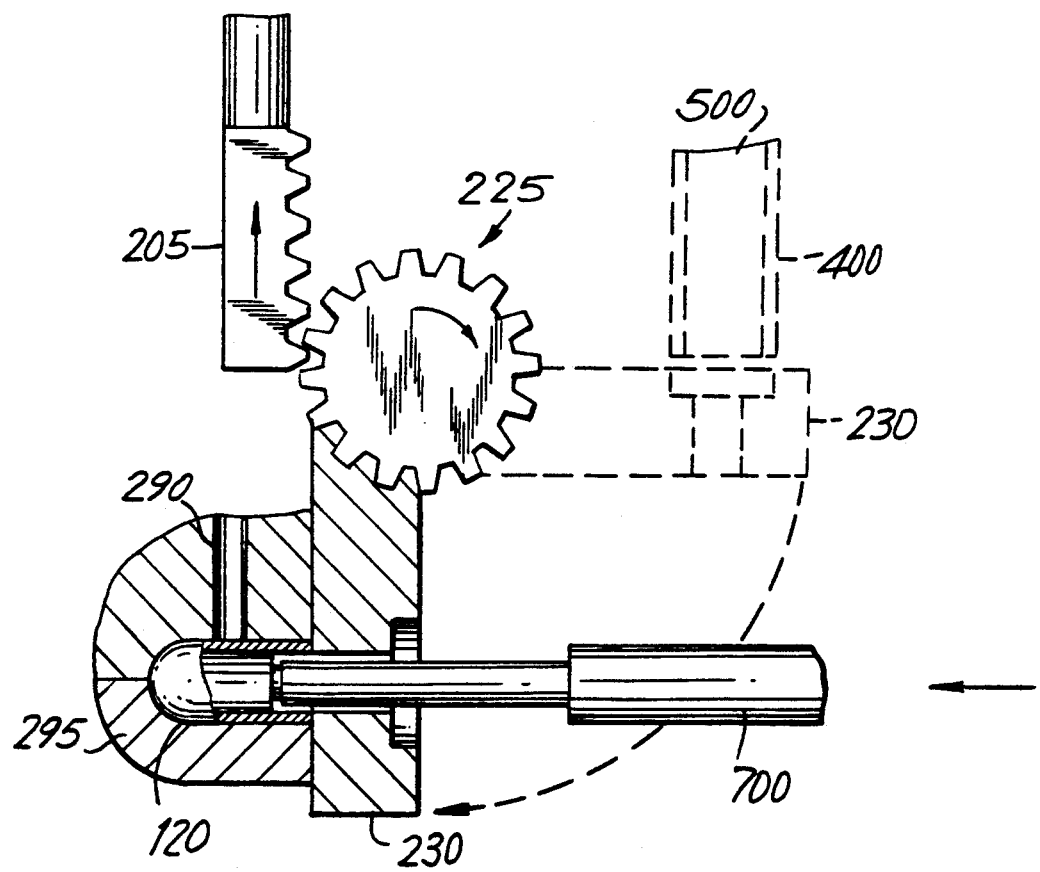
FIG. 9 is a cross-sectional view of an insertion mandrel inserting a cup into the end of a tube.

As the reference workstation rotates from position D to position E, anvil 230 is pivoted in preparation for insertion of cup 810. Referring to FIG. 9, as rotation beyond position D begins, cam 630 starts to move rack 205 radially inward, and so begins to pivot anvil 230 away from cutting and forming mandrels 400 and 500. At position E, anvil 230 is fully pivoted so that its longitudinal axis is directed radially outward from center 115 of apparatus 100. This is the insertion position in which anvil 230 is located adjacent to drum 125 which contains pre-cut tube 120, ready for insertion of cup 810 into tube 120.

Between positions E and F, the reference workstation inserts cup 810 into tube 120. Referring to FIG. 9, beyond position E, cam 670 begins to move insertion mandrel 700 parallel to the axis of rotation of apparatus 100 towards anvil 230. As mandrel 700 moves into anvil 230, it contacts cup 810 and pushes it through anvil 230 into tube 120. At position F, cup 810 is fully inserted, and the axial motion of mandrel 700 ceases. The stroke of mandrel 700 may be adjusted for controlling the depth of insertion of a formed cup into a tube. Thus, two such stations could be used in tandem so that a first cup is inserted into the tube to a first depth at one station, and a second cup is inserted to a second depth in the same tube at the other station, whereby the tube is filled with particular flavor generating material as it is transferred between stations.

Beyond position F, cam 670 retracts mandrel 700 until, at position G, it is fully retracted.

Between positions G and A, tube 120 containing cup 810 is transferred out of its receptacle in drum 125 and a new tube is loaded into its place.

Thus, a method and apparatus for cutting, forming, and inserting cups into tubes is provided One skilled in the art will appreciate that the present invention can be practiced by other than the described embodiments, which are presented here for purposes of illustration and not of limitation, and the present invention is limited only by the claims that follow.

What is claimed is:

1. Apparatus for forming cups from a strip of material and inserting the cups into the ends of tubes, comprising:

means for providing and advancing a strip of material about a first fixed path;

a plurality of receptacles for containing a tube, the plurality of receptacles being spaced apart and mounted for movement in a second fixed path;

a plurality of workstations for forming the cups and inserting the cups into the tubes, the workstations being spaced apart and mounted for movement in a third fixed path, the third fixed path being contiguous with a portion of the first fixed path in a first region and with a portion of the second fixed path in a second region, each workstation comprising means for cutting a disk of material from the strip of material in the first region, means for forming the disk into a cup in the first region, means for locating the cup adjacent a tube in the second region, and means for inserting the cup into a tube in one of the receptacles in the second region; and means for advancing the plurality of receptacles and the plurality of workstations so that, in the second region, a tube in one of the receptacles is held adjacent to a cup formed at one of the plurality of workstations and the cup inserting means inserts the cup into the tube.

2. The apparatus of claim 1 wherein each workstation further comprises:

an anvil having a passage therethrough, a cutting die, a forming die;

means for moving the anvil between a first position and a second position, the first position holding the anvil adjacent the strip of material in the first region and the second position locating the passage aligned with an adjacent tube in the second region; and wherein:

the means for cutting a disk of material from the strip of material further comprises a cutting mandrel having a first diameter and a first longitudinal axis, the cutting mandrel cooperating with the cutting die of the anvil to pierce the strip of material to form the disk;

the means for forming the disk into a cup further comprises a forming mandrel having a second diameter and a second longitudinal axis, the forming mandrel cooperating with the forming die of the anvil to form the disk into the cup;

the means for inserting the cup into the tube further comprises an insertion mandrel having a longitudinal axis for passing through the anvil passage and into the tube; and the means for locating the cup adjacent the tube further comprises a means for pivoting the anvil from the first position to the second position.

3. The apparatus of claim 2 further comprising:

a first cam for controlling the movement of the cutting mandrel and the forming mandrel relative to the anvil;

a second cam for pivoting the anvil between the first and second positions; and a third cam for controlling the movement of the insertion mandrel relative to the anvil.

4. The apparatus of claim 3 wherein, for each workstation, the cutting mandrel further comprises a hollow tube having a ledge on its inner surface, the cutting mandrel being mounted so that the longitudinal axis of the cutting mandrel is oriented perpendicular to the direction of travel in the third fixed path; the forming mandrel further comprises a shaft, a head, and a spring, the forming mandrel being nested inside the cutting mandrel in longitudinal alignment so that the shaft of the forming mandrel projects through the spring and the cutting mandrel, the spring being positioned between the head of the forming mandrel and the ledge of the cutting mandrel, and the head of the forming mandrel being secured to a cam follower which follows the first cam thereby to control the motion of the cutting and forming mandrels along their longitudinal axes.

5. The apparatus of claim 4 wherein the second cam is coupled to the anvil by a rack and a pinion so that the strip of material is held between an anvil and the associated cutting and forming mandrels and the cutting and forming die is aligned with the longitudinal axes of the cutting and forming mandrels in the first region, and the anvil is pivoted away from the associated cutting and forming mandrels in the second region.

6. The apparatus of claim 5 wherein, for each workstation, the cutting and forming die comprises a plug secured in a hole in the anvil, the plug having a face and a circular hole that is aligned with the cutting and forming mandrels in the first position the hole having a diameter that is larger than the diameter of the forming mandrel and smaller than the diameter of the cutting mandrel.

7. The apparatus of claim 6 wherein the second cam causes each anvil to pivot from the first position in the first region to the second position in the second region and the first cam comprises a first segment for causing the cutting mandrel of each workstation to pierce the strip of material and move into the hole in the associated anvil, thereby to form a disk of material having a diameter that is larger than the diameter of the hole in the plug, the disk being held by the pressure of the spring between the cutting mandrel and the face of the plug.

8. The apparatus of claim 7 wherein the first cam further comprises a second segment following the first segment for causing each forming mandrel in the first region to push the formed disk into the hole in the associated plug, thereby to cause the outer edge of the disk to bend around the forming mandrel, thereby to form a cup.

9. The apparatus of claim 8 wherein the first cam further comprises a third segment following the second segment for causing each nested forming mandrel and cutting mandrel to retract form the formed cup in the associated hole in the plug and move away from the anvil.

10. The apparatus of claim 9 wherein the third cam is coupled to each insertion mandrel by a cam follower and the third cam comprises a segment for causing each insertion mandrel to extend through the hole in the plug and to push the cup into the end of the tube held in the adjacent receptacle after each nested cutting and forming mandrel is moved away from the associated anvil.

11. The apparatus of claim 1 further comprising:
a first member having a first plane of rotation, the plurality of receptacles being secured to the first member for movement in the first plane;
means for advancing the first member so that the plurality of receptacles travel along the second fixed path;
a second member having a second plane of rotation, the plurality of work stations being secured to the second member for movement in the second plane;
means for advancing the second member so that the plurality of workstations travel in the third fixed path.

12. The apparatus of claim 11 wherein each workstation further comprises:
an anvil having a passage therethrough, a cutting die, a forming die; and
means for moving the anvil between a first position and a second position, the first position holding the anvil adjacent the strip of material in the first region and the second position locating the passage aligned with an adjacent tube in the second region; and wherein:
the means for cutting a disk of material from the strip of material further comprises a cutting mandrel having a first diameter and a first longitudinal axis, the cutting mandrel cooperating with the cutting die of the anvil to pierce the strip of material to form the disk;
the means for forming the disk into a cup further comprises a forming mandrel having a second diameter and a second longitudinal axis, the forming mandrel cooperating with the forming die of the anvil to form the disk into the cup;
the means for inserting the cup into the tube further comprises an insertion mandrel having a longitudinal axis for passing through the anvil passage and into the tube; and
the means for locating the cup adjacent the tube further comprises a means for pivoting the anvil from the first position the second position.

13. The apparatus of claim 12 wherein each anvil further includes a hood means for stabilizing and encapsulating a tube when the anvil is in the second position, and wherein each receptacle of the first member has at least one passage for applying a vacuum to a tube contained in the receptacle; wherein the hood means and the passage for applying a vacuum cooperate to retain a tube in the receptacle.

14. The apparatus of claim 12 further comprising:
a first cam for controlling the movement of the cutting mandrel and the forming mandrel relative to the anvil;
a second cam for pivoting the anvil between the first and second positions; and
a third cam for controlling the movement of the insertion mandrel relative to the anvil.

15. The apparatus of claim 14 wherein the second cam is coupled to the anvil by a rack and a pinion so that the strip of material is held between an anvil and the associated cutting and forming mandrels and the cutting and forming die is aligned with the longitudinal axes of the cutting and forming mandrels in the first region, and the anvil is pivoted away from the associated cutting and forming mandrels in the second region, and wherein, for each workstation, the cutting and forming die comprises a plug secured in a hole in the anvil, the plug having a face and a circular hole that is aligned with the cutting and forming mandrels in the first position, the hole having a diameter that is larger than the diameter of the forming mandrel and smaller than the diameter of the cutting mandrel, the cutting mandrel further comprising a hollow tube having a ledge on its inner surface, the cutting mandrel being mounted to the first member so that the longitudinal axis of the cutting mandrel is oriented perpendicular to the direction of travel in the third fixed path, the forming mandrel further comprises a shaft, a head, and a spring, the forming mandrel being nested inside the cutting mandrel in longitudinal alignment so that the shaft of the forming mandrel projects through the spring and the cutting mandrel, the spring being positioned between the head of the forming mandrel and the ledge of the cutting mandrel, and the head of the forming mandrel being secured to a cam follower which follows the first cam thereby to control the motion of the cutting and forming mandrels along their longitudinal axes.

16. The apparatus of claim 15 wherein the second cam causes each anvil to pivot from the first position in the first region to the second position in the second region, the first cam comprises a first segment for causing the cutting mandrel of each workstation to pierce the strip of material and move into the hole in the associated anvil, thereby to form a disk of material having a diameter that is larger than the diameter of the hole in the plug, the disk being held by the pressure of the spring between the cutting mandrel and the face of the plug, the first cam further comprises a second segment following the first segment for causing each forming mandrel in the first region to push the formed disk into the hole in the associated plug, thereby to cause the outer edge of the disk to bend around the forming mandrel, thereby to form a cup, the first cam further comprises a third segment following the second segment for causing each nested forming mandrel and cutting mandrel to retract from the formed cup in the associated hole in the plug and move away from the anvil.

17. The apparatus of claim 16 wherein the third cam is coupled to each insertion mandrel by a cam follower and the third cam comprises a segment for causing each insertion mandrel to extend through the hole in the plug and to push the cup into the end of the tube held in the adjacent receptacle after each nested cutting and forming mandrel is moved away from the associated anvil.

18. A method for forming cups from a strip of material and inserting the cups into the ends of tubes, comprising the steps of:
 providing a strip of material;
 providing a first member having a periphery;
 providing a plurality of workstations positioned around the periphery of the first member for forming the cups and inserting the cups into the tubes, each workstation comprising means for cutting a disk of material from the strip of material, means for forming the disk into a cup, means for locating the cup adjacent a tube, and means for inserting the cup into the tube;
 providing a plurality of stationary cams for controlling the means for cutting a disk of material from the strip of material, the means for forming the disk into a cup, the means for locating the cup adjacent a tube, and the means for inserting the cup into the tube;
 providing a second member having a periphery;
 providing a plurality of receptacles for containing a tube, the plurality of receptacles being spaced around the periphery of the second member;
 advancing the first and second members so that each receptacle holds a tube adjacent each workstation in a first region;
 advancing the strip of material around a portion of the periphery of the first member in synchronism with the advance of the first member so that the strip of material comes into relative stationary contact with each workstation in a second region; and
 imparting controlling motion to each of the plurality of workstations by the advance of the workstation on the first member relative to the stationary cams whereby each workstation performs the steps of cutting a disk of material from the strip of material, forming the cut disk into a cup, positioning the formed cup adjacent a tube, and inserting the formed cup into the adjacent tube.

* * * * *